March 22, 1960 H. K. HENISCH 2,929,968

THERMAL SWITCHES

Filed April 30, 1956 2 Sheets-Sheet 1

INVENTOR.
HEINZ K. HENISCH

BY Theodore Jay Jr.

ATTORNEY

March 22, 1960 H. K. HENISCH 2,929,968
THERMAL SWITCHES
Filed April 30, 1956 2 Sheets-Sheet 2

INVENTOR.
HEINZ K. HENISCH
BY Theodore Jay Jr.
ATTORNEY

United States Patent Office
2,929,968
Patented Mar. 22, 1960

2,929,968

THERMAL SWITCHES

Heinz K. Henisch, Flushing, N.Y., assignor, by mesne assignments, to Sylvania Electric Products Inc., Wilmington, Del., a corporation of Delaware Application April 30, 1956, Serial No. 581,466
4 Claims. (Cl. 317—132)

Figure 1:
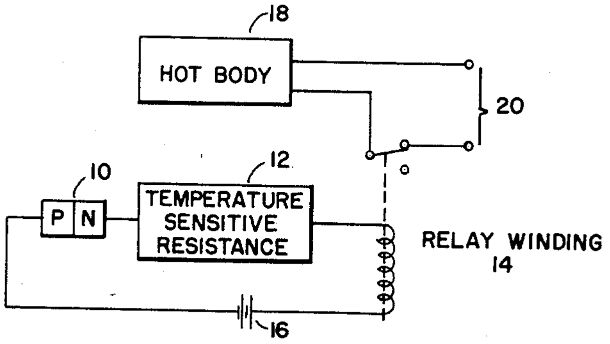

My invention is directed toward thermally actuated switching devices.

A p-n junction formed, for example, from silicon or germanium or certain intermetallic compounds, will exhibit little resistance to current flow in one direciton (the forward direction), but will exhibit a high resistance to current flow in opposite or reverse direction. In general, when certain junctions of this type are biased in a reverse direction of current flow and the biasing voltage is gradually increased, the reverse current will also incerase gradually. However, when the bias voltage is further increased to some definite value (known as the breakdown voltage), the reverse current will exhibit a sudden and pronounced increase. Unless the reverse current at breakdown has been sufficiently high to destroy the electrical properties of the junction, reducing the bias voltage to a point below the breakdown voltage will restore the junction to its original conductive state; no permanent damage will ensue.

Certain types of switching devices known as thermally actuated switching devices are used to actuate or deactivate one or more electrical devices or loads, when the ambient temperature equals or exceeds some selected temperature. Conventionally such devices use p-n junctions only as rectifiers; the junctions are normally separated at voltages considerably below breakdown.

I have discovered that the sensitivity and response speed of such switching devices can be sharply increased through the use of p-n junctions when the breakdown properties of such junctions are utilized.

Accordingly it is an object of the present invention to provide a new and improved thermally actuated switching device of the character indicated.

Another object is to improve sensitivity of thermally actuated switching devices through the use of p-n junctions intermittently operated at breakdown voltages.

Still another object is to provide a new and improved thermally actuated switching device which incorporates one or more p-n junctions and one or more associated thermally sensitive elements.

These and other objects of my invention will either be explained or will become apparent hereinafter.

In my invention there is provided in combination with an electrical power supply a series circuit connected across the supply and including a p-n junction, a thermally sensitive element, and a current sensitive device which can be for example a relay whose winding is included in the series circuit.

The p-n junction in the absence of injected minority charge carriers has a definite voltage. In the presence of minority charge carriers, the junction has a smaller breakdown voltage, the breakdown voltage decreasing as the number of injected carriers increases.

The thermally sensitive element has an electrical resistance which varies with the temperature of the element. For example, the element can be a thermistor whose resistance decreases as the temperature of the thermistor increases.

A hot body which, for example, can be an electrically operated heater is positioned adjacent the element so as to maintain the element at a temperature proportional or equal to the temperature of the body.

The current sensitive device is used to activate or deactivate an electrical load (which can but need not be the hot body itself) in accordance with the current flow through the device. As will be explained in more detail below, when the junction is biased at voltages below the breakdown, the current flow through the device will be low and the load, depending upon the operation desired, can either be actuated or deactuated. However, when the temperature of the body and hence the temperature of the element rises to such a value that due to the change of the resistance of the element the voltage across the p-n junction will increase to equal the breakdown voltage, the current flow through the series circuit will exhibit a sudden and pronounced increase, and the current sensitive device will respond to this pronounced current increase in such manner as to deactuate or actuate the load.

For example, when the device is a relay, relay winding can be used to control the position of associated relay contacts. Electrical power can be supplied to the hot body (the load) through these contacts in such manner that power is only supplied to the body. When the junction is biased at voltages below breakdown, the current flow through the relay winding will be insufficient to energize the relay and the body will be electrically heated.

When the junction bias is increased to equal the breakdown voltage, the sudden increase in current will energize the relay. At this point, the body no longer receives electrical power and begins to cool. The element also begins to cool and due to its change in resistance, the voltage across the p-n junction decreases. When this voltage decreases below breakdown, the relay is deenergized, and power is again supplied to the hot body.

It will be apparent that this arrangement is a thermally actuated switching device. Because of the range of resistance values obtainable by such an element and because of the speed of thermal response to temperature changes in the hot body, this arrangement has appreciably greater sensitivity and response speed than prior known devices.

Moreover, by injecting carriers into the p-n junction and thus controlling the breakdown voltages, the operating temperature can be altered accordingly.

The thermally sensitive element can also be a semiconductor formed for example of germanium or silicon. As is well known the resistance of such a semiconductor changes with temperature. Moreover, as is also well known, this resistance can also be changed by minority carrier injection, and such injection can be used in a manner described in more detail below to accentuate the variation in resistance.

Figure 2:
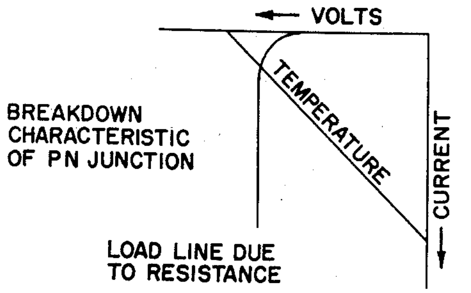
Figure 3:
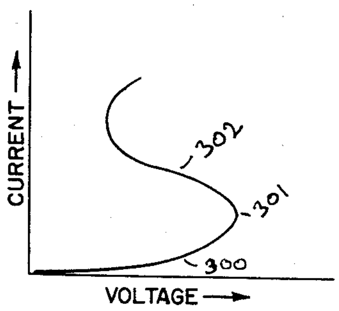
Figure 4:
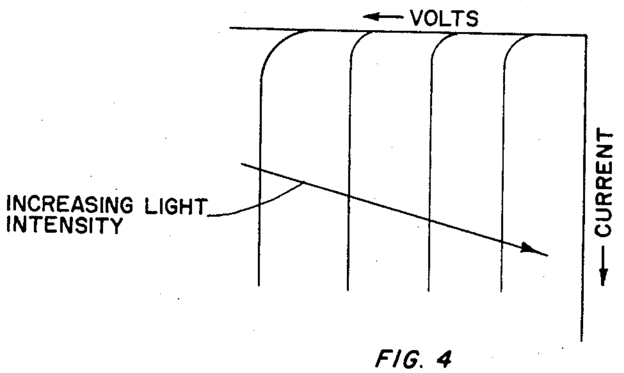
Figure 5:
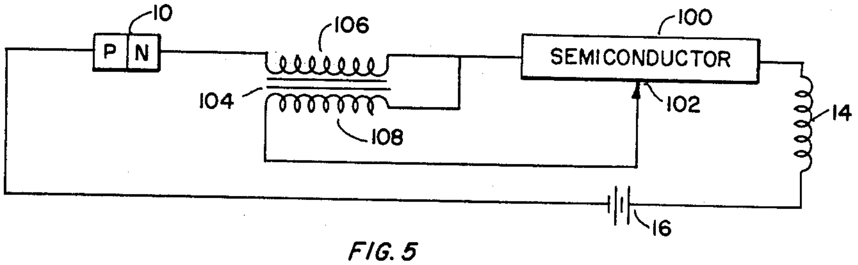
Figure 6:
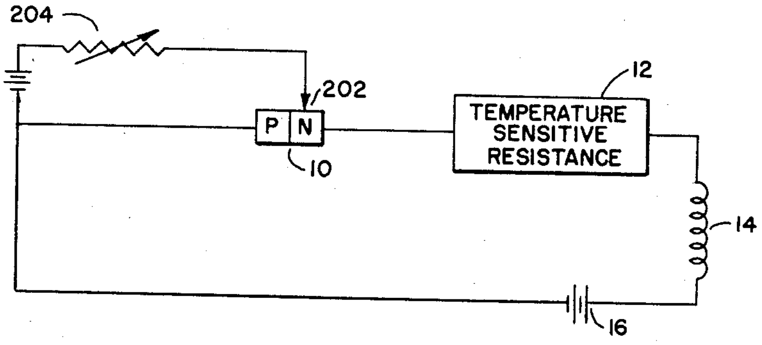

Illustrative embodiments of my invention will now be described in reference to the accompanying drawings, wherein Fig. 1 illustrates one embodiment of a thermally actuated switching device;

Figs. 2, 3, and 4 are graphs illustrating certain electrical properties of p-n junctions; and Figs. 5 and 6, respectively, illustrate second and third embodiments of thermally actuated switches.

Referring now to Fig. 1, there is shown a series circuit including in the order named a body 10 containing a p-n junction, a thermally sensitive element, as for example a temperature sensitive resistance or thermistor 12, a current sensitive device as for example a relay 22 (the winding 14 of relay 22 is included in the series circuit) and a battery 16.

A hot body 18, in this example an electrically operated heater, is positioned adjacent the thermistor 12 so as to change the temperature of the thermistor in accordance with the temperature changes of the body. Electrical energy is applied in conventional manner (not shown) to terminals 20 and is supplied from these terminals through contacts 22 and 21 to the body 18. When the relay is deenergized (the position shown in Fig. 1), the hot body is electrically energized; when the relay is energized, electrical power cannot be supplied to the relay.

The p-n junction 10 is biased in the reverse direction of current flow. The voltage-current relationships of the junction under these conditions are shown in Fig. 2 together with the temperature dependence of the resistance of thermistor 12. It will be seen that as the temperature of the thermistor increases, there will be one temperature at which the voltage across the junction will equal the breakdown voltage, and the relay will be deenergized in the manner previously indicated.

The light radiation from the hot body of course increases as the temperature of the body increases. If the body is so positioned that some of this radiation strikes the p-n junction, minority carriers will be injected into a region in body 10 adjacent the p-n junction in a manner well known to the art. Since the breakdown voltage of the junction increases as the number of injected carriers increases, and since the number of injected carriers increases as the radiation increases, the sensitivity and response speed of the device of Fig. 1 can be increased by utilizing radiation in this manner as illustrated graphically in Fig. 4.

The type of thermistor described in Figs. 1 and 2 has a resistance which decreases more or less linearly as its temperature increases. However, another type of thermistors has a resistance which varies in the manner shown in Fig. 3. When the temperature increases, the resistance of this type of thermistor first increases (region 300). At a predetermined temperature, the resistance attains a maximum value (point 301) and then at higher temperatures decreases very sharply (region 302). Thus as the temperature of such a thermistor increases and attains the predetermined temperature, the voltage across it collapses catastrophically. Use of such a thermistor will again accelerate breakdown of the p-n junction.

In Fig. 5, the thermistor is replaced by a semi-conductor element 100 provided with an injecting point contact 102. The primary winding 106 of transformer 104 is connected between the junction and the element 100. One end of the primary winding 106 is connected to one end of the secondary winding 108. The other end of the secondary winding is connected to the point contact 202.

As the temperature of the element 100 increases, its resistance decreases and the voltage across the back-biased junction increases. As this voltage approaches the breakdown voltage, a current surge is produced in the primary winding 106. The resultant surge in the secondary winding 108 can be of such polarity as to cause minority carriers to be injected by point contact 102 into the element 100, further decreasing its resistance and accelerating the operation of the device.

Fig. 6 utilizes minority carrier injection into the p-n junction itself, as for example by point contact 202. This contact 201 is connected through a variable resistor 204 and a battery 206 to one side of the battery 16. By adjusting the setting of resistor 204, the amount of carrier injection can be adjusted to reduce by some desired amount the breakdown voltage of the junction below the breakdown voltage established in the absence of carrier injection. Thus, by suitable adjustment of the resistor 204, this arrangement can be utilized to energize the relay at various temperatures falling in some predetermined range rather than at one temperature as shown in Fig. 1.

While I have shown and pointed out my invention as applied above, it will be apparent to those skilled in the art that many modifications can be made within the scope and sphere of my invention as defined in the claims which follow.

What is claimed is:

1. In combination with an electrical power supply and an electrical power consuming device, a relay having first and second mutually exclusive switching positions and provided with a winding; means coupled through said relay to said device to supply power thereto only when said relay is in the first position; a series circuit connected across said supply and including a p-n junction; a thermally sensitive element having an electrical resistance which decreases as the temperature of said element increases, and said winding, said p-n junction having a given breakdown voltage at a predetermined temperature, the current flowing in said circuit at temperatures below said predetermined temperature maintaining said relay in said first position, said element having a resistance value which causes the voltage across said junction to be at least equal to said breakdown voltage where the temperature of said element is predetermined, whereby when said junction voltage is at least equal to said breakdown voltage, the current flowing in said circuit sharply increases and places said relay in said second position.

2. In combination with an electrical power supply, a p-n junction having a predetermined breakdown voltage at a selected temperature; a thermally sensitive element having an electrical resistance which decreases as the temperature of said element increases; and a current sensitive device, said junction, said element and said indicator being connected to form a series circuit, said circuit being coupled to said supply whereby current flows in said circuit, said element when its temperature is at least equal to said selected temperature having a resistance at which a voltage drop at least equal to said breakdown voltage is produced across said junction whereby said junction breaks down and the current flow in said circuit sharply increases.

3. In combination with an electrical power supply, a series circuit coupled to said supply and provided with a p-n junction, an indicator, and a thermally sensitive element having an electrical resistance which decreases as the temperature of said element increases, said junction in the absence of injected carriers having a predetermined breakdown voltage and in the presence of injected carriers having a smaller breakdown voltage, said smaller voltage decreasing as the number of injected carriers increases; and means to inject carriers into said junction, whereby when the temperature of said element attains a predetermined value and the number of carriers also attains a predetermined value, said junction breaks down and the current flowing through said junction sharply increases.

4. In combination with an electrical power supply, a series circuit connected across said supply and including a p-n junction provided with an additional injecting point contact, a current sensitive device, and a thermally sensitive element having an electrical resistance which varies in a predetermined manner as the temperature of said element changes; and means coupled between said junction and said contact to energize said contact to thereby inject carriers into said junction.

References Cited in the file of this patent

UNITED STATES PATENTS 2,769,926 Lesk ------------------ Nov. 6, 1956

OTHER REFERENCES

Relay Engineering, Charles A. Packard, first edition, published by Struthers-Dunn, Inc., Philadelphia, Pa., page 316.

Article by Penfield, "Radio and Television News," publication, August 1955, pages 56, 57 and 122.